United States Patent
Xia et al.

(10) Patent No.: US 10,031,894 B2
(45) Date of Patent: Jul. 24, 2018

(54) METHOD AND APPARATUS OF BUILDING INTERMEDIATE CHARACTER LIBRARY

(71) Applicants: Peking University Founder Group Co., Ltd., Beijing (CN); Founder Information Industry Holdings Co., Ltd., Beijing (CN); Beijing Founder Electronics Co., Ltd., Beijing (CN)

(72) Inventors: Lining Xia, Beijing (CN); Yingmin Tang, Beijing (CN)

(73) Assignees: PEKING UNIVERSITY FOUNDER GROUP CO., LTD., Beijing (CN); FOUNDER INFORMATION INDUSTRY HOLDINGS CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 255 days.

(21) Appl. No.: 14/908,741

(22) PCT Filed: Dec. 5, 2013

(86) PCT No.: PCT/CN2013/088620
§ 371 (c)(1),
(2) Date: Jan. 29, 2016

(87) PCT Pub. No.: WO2015/014061
PCT Pub. Date: Feb. 5, 2015

(65) Prior Publication Data
US 2016/0188538 A1    Jun. 30, 2016

(30) Foreign Application Priority Data
Jul. 31, 2013   (CN) .......................... 2013 1 0329911

(51) Int. Cl.
G06K 9/34 (2006.01)
G06F 17/21 (2006.01)
G06F 17/22 (2006.01)

(52) U.S. Cl.
CPC ........ *G06F 17/214* (2013.01); *G06F 17/2223* (2013.01)

(58) Field of Classification Search
CPC ........... G06K 2209/01; G06K 9/00456; G06K 9/344; G06K 9/4604
See application file for complete search history.

(56) References Cited

U.S. PATENT DOCUMENTS 5,917,501 A * 6/1999 Muller .................. G06T 11/203
345/467
2014/0176564 A1 6/2014 Tang et al.

FOREIGN PATENT DOCUMENTS

CN      1420424 A    5/2003
CN    101630311 A    1/2010
(Continued)

OTHER PUBLICATIONS

Office Action for JP 2016-530311, dated Feb. 7, 2017—English Translation.
(Continued)

*Primary Examiner* — Eueng-Nan Yeh
(74) *Attorney, Agent, or Firm* — Brinks Gilson & Lione

(57) ABSTRACT

A method and an apparatus of building an intermediate character library are provided. The method comprises: acquiring an original character library which stores contour information of characters therein; dividing the characters in the original character library into character components, so as to acquire contour information of character components after division; and storing the contour information of the character components into the original character library so as to build an intermediate character library on the original
(Continued)

character library. With the intermediate character library constructed by the method of the present invention, the font creation person can perform selecting and processing simultaneously on multiple single-contour components of a single character during creating of fonts, so that the operation process is simplified and the operation efficiency is improved.

11 Claims, 1 Drawing Sheet

(56) References Cited

FOREIGN PATENT DOCUMENTS

| | | |
|---|---|---|
| CN | 102262683 | 11/2011 |
| CN | 102262683 A | 11/2011 |
| CN | 103186511 A | 7/2013 |
| JP | 1995-140958 A | 6/1995 |
| JP | 1997-134156 A | 5/1997 |
| JP | 2000-242633 A | 9/2000 |
| WO | WO 2013/097826 A1 | 7/2013 |

OTHER PUBLICATIONS

Office Action for KR10-2016-7005099, dated Jan. 19, 2017.
Office Action for Japanese Patent App. No. 2016-530311 dated Nov. 28, 2017 (3 pages).

* cited by examiner

METHOD AND APPARATUS OF BUILDING INTERMEDIATE CHARACTER LIBRARY

CROSS-REFERENCE TO RELATED APPLICATIONS

This application is a national application of PCT/CN2013/088620, filed on Dec. 5, 2013, which application claims a right of priority to Chinese Patent Application No. 201310329911.4, filed Jul. 31, 2013, both of which are incorporated herein by reference in their entirety.

TECHNICAL FIELD

This invention relates to the field of character library technology, and particularly, to a method and apparatus of building an intermediate character library.

DESCRIPTION OF THE RELATED ART

When the font creation person is creating a font, modifying a font, and performing an operation on contour points, it is often required to add, delete or drag single-contour(s) of a character and contour points on the single-contour one by one, which may cause the operation to be more trouble, especially when multiple single-contours need to be processed at the same time (for example, it is required to drag the position of one radical, or even to replace the radical). Because many radicals are each comprised of multiple single-contours, in order to keep relative positions of the contours of one radical unchanged during moving or replacing the radical, usually it is difficult to achieve the expected effect by moving or replacing the respective single-contours one by one, and such operations are very troublesome.

Currently, the common solution is that, multiple single-contours are simultaneously selected by clicking and picking the multiple single-contours one by one with a software (usually, the font creation tool), and then the selected multiple single-contours are processed as a whole. With such solution, it will take much time and work to click and pick the multiple single-contours one by one in the case of a large number of the single-contours, and thus, its efficiency is very low and it is easy to make mistakes.

SUMMARY OF THE INVENTION

One technical problem to be solved by the present invention is directed to the above-described drawbacks in the prior art, and in view of this, the present invention provides a method and an apparatus of building an intermediate character library. With the intermediate character library constructed by the method and apparatus of the present invention, the font creation person can perform selecting and processing simultaneously on multiple single-contour components of a single character during creating of fonts, so that the operation process is simplified and the operation efficiency is improved.

One technical solution adopted for solving the technical problem according to the present invention is a method of building an intermediate character library, comprising the following steps:

1) acquiring an original character library which stores contour information of characters therein;

2) dividing a character in the original character library into character components, so as to acquire contour information of the character components obtained by the dividing;

3) storing the contour information of the character components into the original character library so as to build an intermediate character library on the original character library.

Preferably, the step 2) further comprises: acquiring structure information of the character components, wherein the structure information includes mapping relation between the character components and the character corresponding to the character components, and information regarding positions of the character components in the corresponding character;

the step 3) comprises: storing the contour information and the structure information of the character components into the original character library so as to build an intermediate character library on the original character library.

Preferably, specifically, the step 2) comprises:

21) reading one arbitrary character in the original character library, and dividing this character into two or more character components so as to acquire contour information of respective character components obtained by the dividing;

22) creating structure information of respective character components;

23) repeating the steps 21)-22), so as to acquire contour information and structure information of a next character in the original character library.

Preferably, before the step 21), the method further comprises:

20) reading one arbitrary character in the original character library, and determining whether this character can be divided into character components or not; if so, proceeding to the step 21); otherwise, proceeding to the step 23).

Preferably, in the step 2), the character components obtained by dividing the character are character, radical or stroke.

More preferably, the original character library has a character code of the character stored therein, the step of acquiring structure information of the character components in the step 2) comprises acquiring structure codes of the character components, wherein the structure code of one of the character components includes the character code of the character corresponding to this character component, component code of this character component itself, and position code of this character component in its corresponding character.

Preferably, in the step 2), in the case that the character component is a character, the component code of this character component itself is set to be the character code of this character;

in the case that the character component is a radical or stroke, each of single-contours in this character component is marked by adding an index to it, and the component code of this character component itself is set to be comprised of values of the indexes added to respective single-contours.

Preferably, the character in the original character library is read by a font creation tool, which also can display, process and store the character in the original character library, and can identify and store the contour information and structure information of the character components.

More preferably, before the step 1), further comprising the following step: creating the original character library.

An apparatus of building an intermediate character library comprises:

acquiring unit, configured for acquiring an original character library which stores contour information of characters therein;

character components forming unit, configured for dividing a character in the original character library into character components, so as to acquire contour information of the character components obtained by the dividing;

storing unit, configured for storing the contour information of the character components into the original character library so as to build an intermediate character library on the original character library.

Preferably, the character components forming unit is further configured for acquiring structure information of the character components, wherein the structure information includes mapping relation between the character components and the character corresponding to the character components, and information regarding positions of the character components in the corresponding character;

the storing unit is further configured for storing the structure information of the character components into the original character library.

Preferably, the apparatus further comprises:

determining unit, configured for reading a character in the original character library, and determining whether this character can be divided into character components or not; and if so, outputting this character to the character components forming unit; otherwise, reading a next character in the original character library.

Preferably, the apparatus further comprises:

original character library creation unit, configured for creating the original character library.

The advantageous effects of the present invention are stated below:

The intermediate character library built according to the present invention is based on the original character library, while adding information related to the character components, i.e., contour information (contour data) of the character components, and optionally structure information of the character components, into the original character library. Such intermediate character library according to the present invention helps the font creation person to modify and process one character component as a whole, to replace the character component as a whole, or to combine the character components, during the creation of the font. Further, such intermediate character library facilitates reusing of the character components. Using the intermediate character library built according to the present invention when creating or modifying the font, it can avoid operating multiple single-contours or contour points of the character one by one every time, and thus the operation efficiency can be improved and the operation flow can be simplified.

The method of building an intermediate character library according to the present invention is easy to do, and has better usability and reusability.

DETAILED DESCRIPTION OF THE PREFERRED EMBODIMENT

For those skilled in the art to better understand the solutions of the present invention, the present invention will be described in details with reference to the accompanying drawings in the following.

Embodiment 1

The present embodiment provides a method of building an intermediate character library, comprising the following steps:

1) acquiring an original character library which stores contour information of characters therein;

2) dividing a character in the original character library into character components, so as to acquire contour information of the character components obtained by the dividing;

3) storing the contour information of the character components into the original character library so as to build an intermediate character library on the original character library.

Preferably, the step 2) further comprises:

acquiring structure information of the character components, wherein the structure information includes mapping relation between the character components and the character corresponding to the character components, and information regarding positions of the character components in the corresponding character;

In the step 3), the contour information and the structure information of the character components are stored into the original character library so as to build an intermediate character library on the original character library.

Figure 2:
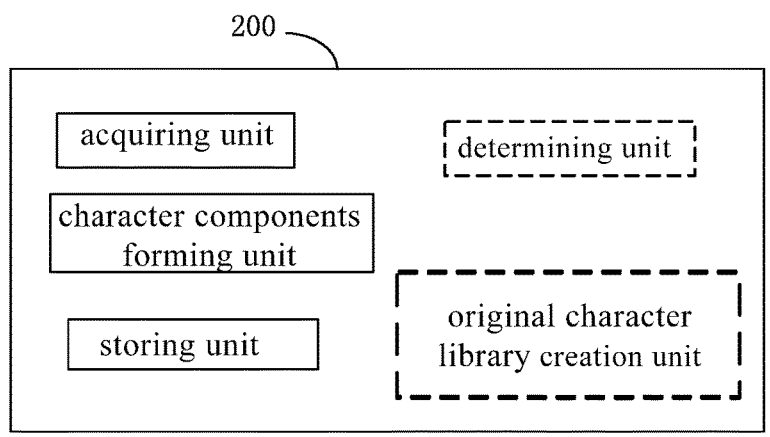
FIG. 2 shows a schematic block diagram for an apparatus of building an intermediate character library according to an embodiment of the present invention.

As shown in FIG. 2, the present embodiment also provides an apparatus 200 of building an intermediate character library, which comprises:

acquiring unit, configured for acquiring an original character library which stores contour information of characters therein;

character components forming unit, configured for dividing a character in the original character library into character components, so as to acquire contour information of the character components obtained by the dividing;

storing unit, configured for storing the contour information of the character components into the original character library so as to build an intermediate character library on the original character library.

Preferably, the character components forming unit is further configured for acquiring structure information of the character components, wherein the structure information includes mapping relation between the character components and the character corresponding to the character components, and information regarding positions of the character components in the corresponding character; the storing unit is further configured for storing the structure information of the character components into the original character library.

In the present embodiment, the character refers to a character including at least one character component and having a certain structure, for example, Chinese character, Korean character, Japanese character, and the like.

As shown by the dashed boxes in FIG. 2, optionally, the apparatus 200 may further comprise a determining unit and an original character library creation unit. The determining unit may be configured for reading a character in the original character library, and determining whether this character can be divided into character components or not; and if so, outputting this character to the character components forming unit; otherwise, reading a next character in the original character library. The original character library creation unit may be configured for creating the original character library.

Embodiment 2

Figure 1:
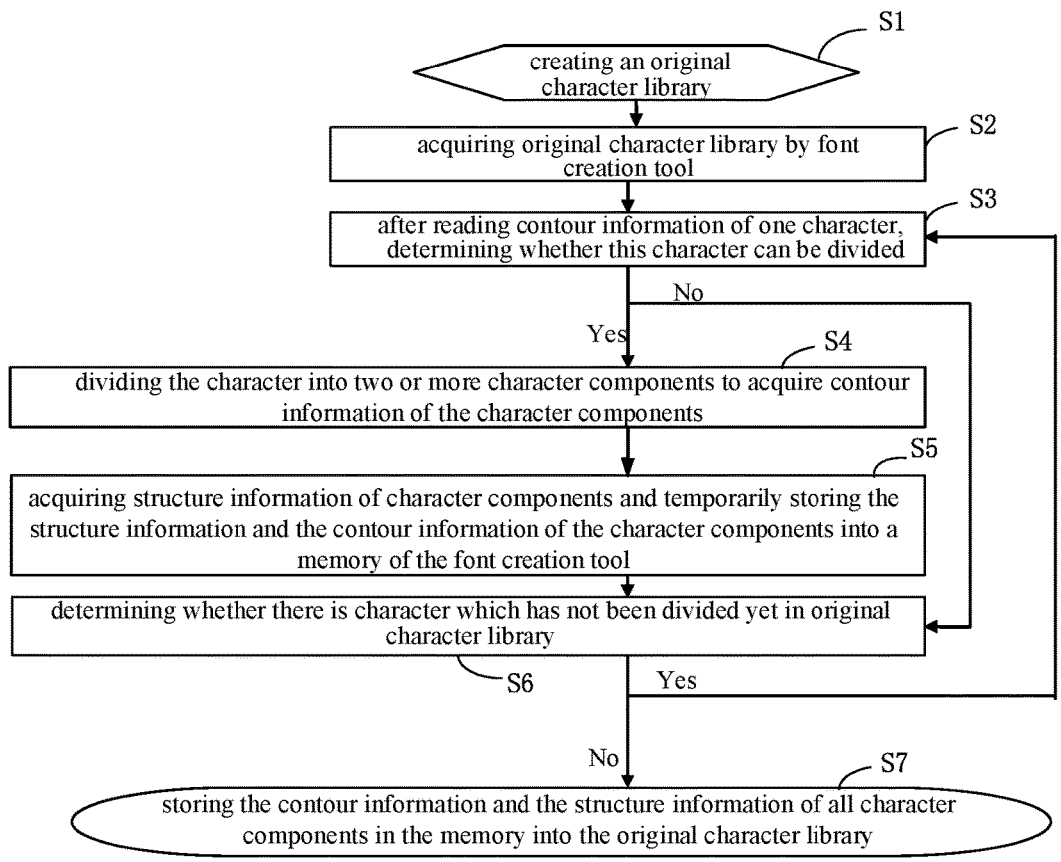
FIG. 1 is a flowchart showing a method of building an intermediate character library according to Embodiment 2 of the present invention.

As shown in FIG. 1, this embodiment provides a method of building an intermediate character library, comprising the following steps:

Step S1: creating an original character library.

In the present embodiment, the original character library is created by a font creation tool. Specifically, the created original character library is a Chinese character library. That is, the characters in the original character library are Chinese characters.

The original character library stores basic information of this character library and contour information of Chinese characters therein.

Further, the basic information of the character library comprises the number, character codes, lengths and widths of the Chinese characters in this character library, and the contour information of the Chinese characters mainly refers to contour data of the Chinese characters.

In the original character library, each Chinese character comprises one or more single-contours (usually the single-contour is a stroke of the character), and each single-contour may comprise multiple contour points.

Step S2: acquiring the original character library.

In the present embodiment, the original character library created in the step S1 is opened by the font creation tool, so that the original character library is acquired.

The font creation tool is required to have the ability to open the original character library, and to read, display, process and store the original character library.

Specifically, the font creation tool can read Chinese characters in the original character library, can identify contour data of the Chinese characters in the original character library, and can display one or more single-contours in each of the Chinese characters and contour points on each single-contour. Furthermore, the font creation tool can perform some basic operations on the single-contour and the contour points, such as, selecting and dragging the single-contour or contour points, and the like. Upon opening the original character library, the font data (i.e., contour data) of the character in the original character library is displayed in a display interface, for use in subsequent operations performed by the operator. The font creation tool further can save the modified font data of the character, and can store the added contour information and structure information of the character components into the original character library.

In the present embodiment, the font creation tool is also required to have the ability to identify contour information and structure information of respective character components obtained by dividing the Chinese character and to store the contour information and structure information of the character components into its memory. Further, the structure information mainly comprises mapping relation between the character components and the character corresponding to the character components, and information regarding positions of the character components in the corresponding character. Thus, with the built intermediate character library, as there is contour information of the respective character components stored in the intermediate character library, the font creation tool can select the contour data of one character component during the displaying, i.e., can perform operation on one character component as a whole. For example, the entire character component can be moved, copied, replaced, modified or the like as a whole. When the character component is selected, it can be seen which contours are contained in this character component. Further, because the structure information of the character component can also be stored in the intermediate character library, when necessary, the character component can be searched for or replaced, so as to find the same component at the same position.

Step S3: reading one arbitrary character in the original character library, and determining whether this character can be divided into two or more character components or not; if so, proceeding to step S4; otherwise, proceeding to step S6, which determines whether there is any undivided character in the original character library and, if so, returns to the step S3 to read a next character in the original character library.

Herein, the term "character component" means a relatively independent structure unit in a Chinese character, which can be obtained by various dividing methods. For example, the character component may be an individual character, such as the character components, i.e., the character "米" and the character "大", obtained by dividing the character "类" into "米" and "大". The character component may also be a stroke, such as horizontal stroke, dot stroke and the like. The character component may also be a "radical", such as the radicals "亻", "刂", "宀" and the like. The character component may also be a constituent part of the Chinese character, such as the lower part "又" of the Chinese character "发" as one character component, and the remaining part "乀" as another character component, which is obtained by removing the part "又" from the Chinese character "发".

Specifically, the standard for determining whether the Chinese character can be divided is that: whether the Chinese character can be divided into two or more components. If so, it indicates that this character can be divided; otherwise, this Chinese character cannot be divided.

Whether the Chinese character in the original character library can be divided is determined mainly based on the structure of this Chinese character itself. If the current Chinese character can be divided into two or more character components, it indicates that this Chinese character can be divided, and then proceeds to step S4. If the current Chinese character cannot be divided, such as the Chinese character "人", "口" or the like, the font creation tool proceeds to read a next Chinese character.

Step S4: after determining the character can be divided in step S3, dividing the character into two or more character components to acquire contour information of the respective character components after the dividing.

Specifically, in the present embodiment, the Chinese character is divided by the font creation tool.

Further, dividing the Chinese character can be done according to the structure of the Chinese character itself. Specifically, by reference to structure code of IDS attribute in Standard ISO 10646, a Chinese character can be divided according to the IDS attribute. The IDS attribute is an attribute that classifies structures of the Chinese characters, and with it, the Chinese characters can be classified into different structure styles, such as, left-right, top-down, left-middle-right, fully surrounded, not fully surrounded structures and the like. For example, if the structure of the Chinese character is the top-down structure, then this character can be divided into two character components, i.e., a top component and a down component. For example, the Chinese character "类" is divided into two character components "米" and "大" which also belong to the Chinese characters. If the structure of the Chinese character is the left-right structure, then it is divided into two character components, i.e., a left component and a right component. For example, the Chinese character "移" is divided into two character components "禾" and "多" which also belong to the Chinese characters, and the Chinese character "位" is divided into two character components "亻" and "立". If the structure of the Chinese character is the surrounded structure, it is divided into two character components, i.e., the surrounding part and the surrounded part. For example, the Chinese character "粥" is divided into two character components "弓" and "玉". If the structure of the Chinese character is the top-middle-down or left-middle-right structure, it can accordingly be divided into three character components. For example, the Chinese character "冀" can be divided into three character components, i.e., "北", "田" and "共", the Chinese character "粥" can be divided into three character components, i.e., "弓", "米" and "弓", and the like.

The process of dividing the Chinese character actually is for selecting one or more single-contours contained in each of the character components in this Chinese character. That is to say, one or more single-contours contained in each of the character components obtained by the dividing can be selected all together as a group.

Step S5: establishing and acquiring structure information of respective character components in the character which has been divided in the step S4.

In the present embodiment, establishing the structure information of the character component specifically comprises, establishing a structure code of the character component. Specifically, the structure code of the character component comprises: the character code of the character corresponding to this character component, component code of this character component itself, and position code of this character component in its corresponding character.

In the present embodiment, the character code employs the Unicode code. Of course, the character code may also employ other common Chinese character codes.

Because the character component obtained by dividing the character may be another character, a radical or a stroke, the component code of this character component itself may be set according to different type of the character component. Further, the character component usually comprises multiple single-contours each of which in turn comprises multiple contour points.

When the character component obtained by the dividing is another character, the component code of this character component itself may be set to the character code of said another character.

When the character component is a radical or a stroke, that is, when the character component obtained by the dividing is not a Chinese character, the component code of this character component itself may be set to a freely-defined code, which is not identical to the existing character codes of the Chinese characters, and need to be set within a range beyond the range of normal character codes of the Chinese characters. However, the freely-defined code may have a certain meaning, e.g., the component code may indicate the position of this character component in its corresponding character and the glyph of the character component. Specifically, each of single-contours in this character component may be marked by adding an index to it. As each of single-contours in a single Chinese character has its index value, each of the character components may be consisted of contours represented by some index values, and the component code of this character component itself may be set to be comprised of the index values added to respective single-contours.

In this way, it can be clearly known that the Chinese character subject to the dividing process is comprised of how many character components, and each of the character components is comprised of which single-contours.

As to the position code, it is defined mainly based on the position of the character component in the corresponding character.

For example, for the Chinese character "类" in the original character library, after the dividing process, the obtained character components are "米" and "大", and accordingly the structure code of the character component "米" may be set to be "7C7B7C7301", and the structure code of the character component "大" may be set to be "7C7B592702". Specifically, the higher four bits (i.e., "7C7B") of the structure codes of the two character components represent the Unicode code of the Chinese character "类", the middle four bits (i.e., "7C73" and "5927") represent the respective Unicode codes of the Chinese characters identical to the two character components, and the lower two bits (i.e., "01" and "02") represent the respective position information (i.e., the position codes) of the two character components in the corresponding Chinese character "类", where "01" indicates the top component in the top-down structure, and "02" indicates the down component in the top-down structure.

After dividing a Chinese character and setting its corresponding structure information, the contour information and structure information of the character components obtained by the dividing process can be temporarily stored into the memory of the font creation tool.

Step S6: determining whether there is any character which has not been divided yet in the original character library. If so, return to the step S3, so as to repeat the steps S3-S5, thereby acquiring contour information and structure information of a next character in the original character library.

After dividing a Chinese character and setting its corresponding structure information, its contour information and structure information can be temporarily stored into the memory of the font creation tool. Then, proceed to dividing a next character.

Step S7: storing the contour information and the structure information of the character components into the original character library so as to build an intermediate character library on the original character library. After storing the contour information and structure information of the character components of all the characters which can be divided in the original character library into the original character library, the original character library forms the intermediate character library.

If there is no Chinese character in the original character library, which needs to be divided, the contour data and structure codes of the characters stored in the memory of the font creation tool need to be stored into the original character library. This requires the font creation tool itself having such ability of storing the contour data and structure codes of the characters completely into the original character library, so that the original character library forms the intermediate character library.

When all the Chinese characters have been divided into the character components, those above-described information (including the contour information and structure information of the character components) may be stored into a new file. When writing those above-described information into the new file, it is better to also write the hierarchical relationship of "Character→Component→Contour→Point" into this file, for facilitating subsequent reading. Therefore, when creating a font by using the font creation tool, by reading this file so as to read this hierarchical relationship, it will be better understood which specific contours constitute the character component. Thereby, the information and data related to the character component can be directly read out from this file during subsequent utilization.

Embodiment 3

The present embodiment provides an apparatus of building an intermediate character library, which comprises:

acquiring unit, configured for acquiring an original character library which stores contour information of characters therein;

character components forming unit, configured for dividing a character in the original character library into character components, so as to acquire contour information of the character components obtained by the dividing, and configured for acquiring structure information of the character components, wherein the structure information includes mapping relation between the character components and the character corresponding to the character components, and information regarding positions of the character components in the corresponding character;

storing unit, configured for storing the contour information and the structure information of the character components into the original character library so as to build an intermediate character library on the original character library.

Preferably, the apparatus further comprises a determining unit, which is configured for reading a character in the original character library, and determining whether this character can be divided into character components or not; and if so, outputting this character to the character components forming unit; otherwise, reading a next character in the original character library.

Preferably, the apparatus further comprises an original character library creation unit, which is configured for creating the original character library.

Embodiment 4

The present embodiment provides a method of building an intermediate character library, which is different from the method according to Embodiment 2 in that: the method according to the present embodiment does not comprise the step S1, and employs the existing character library as the original character library.

Other steps in the method according to the present embodiment are the same as those in the method according to Embodiment 2, and thus their descriptions will not be repeated herein.

Embodiment 5

The present embodiment provides a method of building an intermediate character library, which is different from the method according to Embodiment 2 in that: the method according to the present embodiment adopts a Japanese character library, instead of the Chinese character library, as the original character library.

Other steps in the method according to the present embodiment are the same as those in the method according to Embodiment 2, and thus their descriptions will not be repeated herein.

This disclosure also provides one or more computer readable medium having stored thereon computer-executable instructions that when executed by a computer perform various steps of the method in the above-described respective embodiment.

This disclosure also provides a computer with one or more computer readable medium having stored thereon computer-executable instructions that when executed by the computer perform the method in the above-described respective embodiment.

Exemplary Operating Environment

The computer or computing device as described herein comprises hardware, including one or more processors or processing units, system memory and some types of computer readable media. By way of example and not limitation, computer readable media comprise computer storage media and communication media. Computer storage media comprises volatile or non-volatile, removable or non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may use one or more remote computers, such as logical connections to remote computers operated in a networked environment. Although various embodiments of the present disclosure are described in the context of the exemplary computing system environment, various embodiments of the present disclosure may be used with numerous other general purpose or application specific computing system environments or configurations. The computing system environment is not intended for limiting any aspect of the scope of use or functionality of the invention. In addition, the computer environment should not be interpreted as depending on or requiring any one or combination of components shown in the exemplary operating environment. Well-known examples of the computing systems, the environment and/or configurations suitable for all aspects of the present disclosure include, but are not limited to: personal computers, server computers, handheld or laptop devices, multiprocessor systems, microprocessor-based systems, set top boxes, programmable consumer electronics, mobile phone, network PC, minicomputers, mainframe computers, distributed computing environments including any one of the above systems or devices, and so on.

Various embodiments of the invention may be described in a general context of computer executable instructions such as program modules executed on one or more computers or other devices. The computer-executable instructions may be organized into one or more computer-executable components or modules as software. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

It is to be understood that, the above exemplary embodiments have been described merely for the purpose of explaining the principle of the present invention, and the invention is not limited to the disclosed exemplary embodiments. Those skilled in the art may readily make various modification and variation to the invention without departing from the spirit and scope of the invention, and all such modifications and variation are also deemed to be encompassed in the protection scope of the present invention.

What is claimed is:

1. A method of building an intermediate character library, characterized by comprising the following steps:
   1) acquiring, by a computer, an original character library which stores contour information of characters therein;
   2) dividing, by the computer, a character in the original character library into character components, so as to acquire, from the contour information of the character, contour information of the character components obtained by the dividing and acquire structure information of the character components;
   3) storing, by the computer, the contour information and the structure information of the character components into the original character library so as to build an intermediate character library on the original character library,
   wherein the structure information includes mapping relation between the character components and the character corresponding to the character components, and information regarding positions of the character components in the corresponding character.

2. The method according to claim 1, characterized in that the step 2) comprises:
   21) reading, by the computer, each one of multiple characters in the original character library, and dividing each character into two or more character components so as to acquire contour information and structure information of respective character components obtained by the dividing.

3. The method according to claim 2, characterized in that, the step 21) comprises:
   20) reading, by the computer, each one of multiple characters in the original character library, determining, by the computer, whether each character can be divided into character components or not, and in response to determining one character can be divided into character components, dividing this character into two or more character components so as to acquire contour information and structure information of respective character components obtained by the dividing.

4. The method according to claim 2 characterized in that the character in the original character library is read by a font creation tool, which also can display, process and store the character in the original character library, and can identify and store the contour information and structure information of the character components.

5. The method according to claim 1, characterized in that in the step 2), the character components obtained by dividing the character are character, radical or stroke.

6. The method according to claim 5, characterized in that the original character library has a character code of the character stored therein, the step of acquiring, by the structure, structure information of the character components in the step 2) comprises acquiring, by the computer, structure codes of the character components, wherein the structure code of one of the character components includes the character code of the character corresponding to this character component, component code of this character component itself, and position code of this character component in its corresponding character.

7. The method according to claim 6, characterized in that in the step 2), in the case that the character component is a character, the component code of this character component itself is set to be the character code of this character;
   in the case that the character component is a radical or stroke, an index is assigned to each of single-contours in this character component, and the component code of this character component itself is set to be comprised of values of the indexes assigned to the respective single-contours.

8. The method according to claim 1, characterized by, before the step 1), further comprising the following step:
   creating, by the computer, the original character library.

9. An apparatus of building an intermediate character library, characterized by comprising:
   one or more processors;
   one or more memories storing instructions that when executed by the processors cause the processors to perform steps of:
   1) acquiring an original character library which stores contour information of characters therein;
   2) dividing a character in the original character library into character components, so as to acquire, from the contour information of the character, contour information of the character components obtained by the dividing and acquire structure information of the character components; and
   3) storing the contour information and the structure information of the character components into the original character library,
   wherein the structure information includes mapping relation between the character components and the character corresponding to the character components, and information regarding positions of the character components in the corresponding character.

10. The apparatus according to claim 9, characterized in that, the step 2) comprises:
    21) reading each one of multiple characters in the original character library, determining whether each character can be divided into character components or not,
    and in response to determining one character can be divided into character components, dividing this character into two or more character components so as to acquire contour information and structure information of respective character components obtained by the dividing.

11. The apparatus according to claim 9, characterized in that, the memories store further instructions that when executed by the processors cause the processors to perform step of:
    creating the original character library, before acquiring the original character library.

* * * * *